United States Patent [19]

Simonsen

[11] 4,309,795
[45] Jan. 12, 1982

[54] METHOD AND APPARATUS FOR DE-HAIRING HOGS

[76] Inventor: Knud Simonsen, P.O. Box 4, Nobleton, Ontario, Canada, L0G 1N0

[21] Appl. No.: 136,692

[22] Filed: Apr. 2, 1980

[30] Foreign Application Priority Data

Apr. 6, 1980 [CA] Canada .................................. 325109

[51] Int. Cl.³ .............................................. A22B 5/08
[52] U.S. Cl. ......................................... 17/47; 17/13; 17/51
[58] Field of Search ................... 17/15, 11.2, 51, 13, 17/47

[56] References Cited

U.S. PATENT DOCUMENTS

| | | | |
|---|---|---|---|
| 2,549,070 | 4/1951 | Drews | 17/11.2 |
| 2,820,246 | 1/1958 | Thomas | 17/15 |
| 3,135,016 | 6/1964 | Ekstam et al. | 17/15 |

*Primary Examiner*—Willie G. Abercrombie

*Attorney, Agent, or Firm*—George A. Rolston; William F. Frank

[57] ABSTRACT

A process for the scalding and de-hairing of hogs under improved sanitary conditions comprising conveying the hog in an essentially horizontal manner, along a predetermined treatment path, continuously spraying the hog while on such treatment path, with clean water at between 62° C. and 63° C., continuously rotating the hog while moving along such treatment path, continuously scraping the hog to remove hair while moving along such treatment path, collecting the water beneath the hog, filtering the water, passing it into an evaporation chamber, and evaporating the water to produce water vapor, removing contaminants from said evaporation chamber, and passing said vapor to a condenser chamber and continuously condensing said vapor therein to provide clean uncontaminated water, for spraying onto the hog as aforesaid.

The invention further comprises apparatus for carrying out the process.

16 Claims, 3 Drawing Figures

METHOD AND APPARATUS FOR DE-HAIRING HOGS

The invention relates to a method and apparatus for the de-hairing of hogs, under improved sanitary conditions.

In order to de-hair hogs, it is necessary to scald the hair and skin of the hog with water at a predetermined temperature between about 62° C. and 63° C. More or less precise temperature control is essential for the process in order to achieve efficient hair removal. Usually the hogs are simply dragged one after the other through a tank of water at the desired temperature. Subsequently each hog is then removed from the tank and is subjected to an abrasive treatment to remove the hair.

In addition to softening the hair follicles, for subsequent removal, the scalding procedure effectively cleans the hogs, and washes away traces of blood, which may remain after the hog has been bled.

As a result, the water rapidly becomes contaminated with hair, blood and any other foreign matter, i.e. dirt, adhering to the hog when it is killed.

In the past, little has been done concerning the problem of contaminated water, and in fact some portions of the hog treated in such contaminated water may have to be discarded.

Proposals have been made for scalding hogs by showering them while suspended vertically from a conveyor rail over a tank.

Such proposals have however been relatively energy inefficient, and are becoming increasingly costly. In addition, such processes involve the man-handling of a hog onto a conveyor rail, and off again. In addition, there was a certain delay between the scalding of the hog on the rail, and subsequent removal of the hog from the rail followed by the actual abrasive removal of the hair itself.

For all of these reasons, therefore, the scalding of hogs on a rail cannot be regarded as a totally acceptable solution to the problem.

It is a general objective, therefore, of the invention to provide a process for the scalding of hogs, which is carried on simultaneously with abrasive treatment of the hogs for de-hairing, and in which the use of contaminated water is as far as possible eliminated thereby leading to improved sanitary conditions.

In addition, the invention avoids the requirement for suspending the hogs from a rail.

In accordance with the invention, the process comprises generally conveying the hog in an essentially horizontal manner, along a predetermined treatment path, continuously spraying the hog while on such treatment path, with clean water at between 62° C. and 63° C., continuously rotating the hog while moving along such treatment path, continuously scraping the hog to remove hair while moving along such treatment path, collecting the water beneath the hog, filtering the water, passing it into an evaporation chamber, and evaporating the water to produce water vapour, removing contaminants from said evaporation chamber, and passing said vapour to a condenser chamber and continuously condensing said vapour therein to provide clean uncontaminated water, for spraying onto the hog as aforesaid.

The invention further comprises means for maintaining said evaporation chamber at a reduced pressure whereby to lower the boiling point of said water.

The invention further comprises recovering of heat values in said condenser chamber and returning same to said evaporation chamber.

The invention further comprises simultaneously subjecting the hog to saturated steam, or water vapour, to assist in wetting the hair and skin.

The invention further comprises the continuous monitoring of water temperature at the spray heads, and regulating water temperature in the circulation system, to maintain a stable predetermined temperature at the spray heads.

The invention further comprises apparatus for simultaneously scalding and de-hairing hogs comprising support means for supporting a hog in a generally horizontal fashion, and extending along a predetermined path; power operated means operable to displace the hog along the path, and operable to remove hair therefrom, water spray means operable to spray water over the hog as the same moves along such path, collector tank means located beneath such path, to collect water from hogs moving therealong, hair removal means for collecting and removing hair displaced from hogs on such path, water removal means for removing water from such collector tank, and having pump means operatively associated therewith, filter means for filtering water as the same is removed, a water evaporator chamber, and heat exchanger means therein, drain means for removing contaminants from said evaporator chamber, water condenser means for receiving water vapour from said evaporator, and condensing the same into water, and having heat exchanger means therein, pump means for removing water from such chamber and supplying same to said spray heads under pressure.

The invention further comprises means for maintaining the evaporator chamber at a reduced pressure whereby to lower the boiling point of water therein.

The invention further comprises water vapour duct means connected to receive vapour from the evaporator chamber and eject the same around the hog.

The invention further comprises that the heat exchanger means in the evaporator chamber and in the condenser are coupled together in heat exchange relationship whereby to maximize the thermal efficiency of the system.

The invention further comprises that the apparatus includes temperature sensor means for monitoring the temperature of water supply to the spray heads, and automatic control circuit means, for regulating the operation of the system, whereby to maintain a stable operating temperature.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

Figure 1:
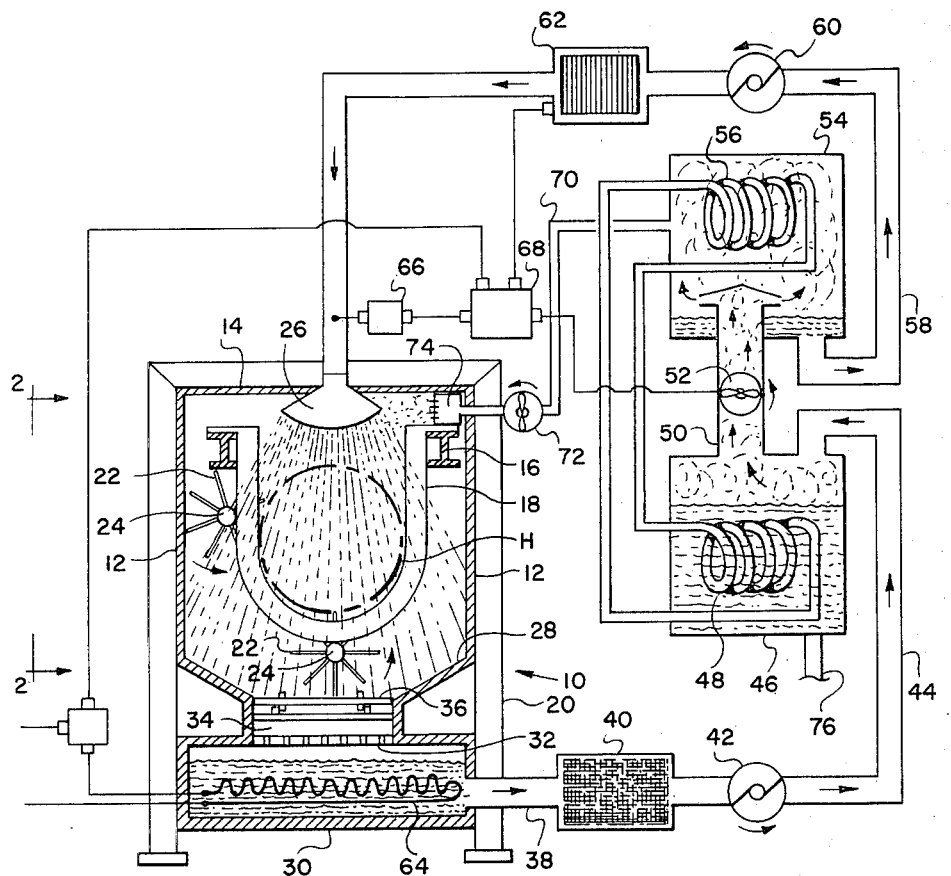
FIG. 1 is a schematic end elevational view showing the system according to the invention.
Figure 2:
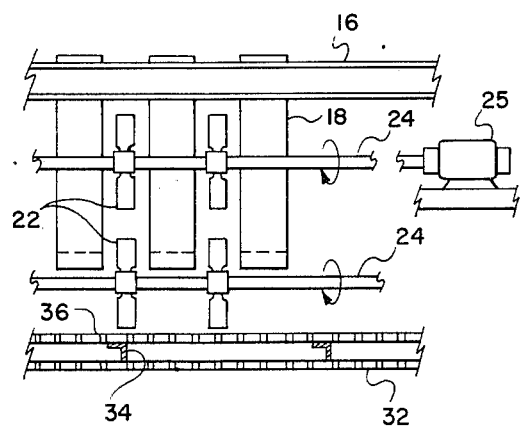
FIG. 2 is a schematic side elevation of a portion only of the apparatus in FIG. 1, and, FIG. 3 is a perspective of the beaters.
Figure 3:
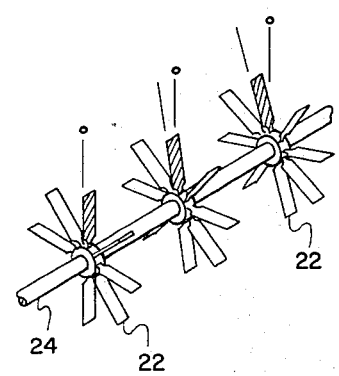

Referring now to the drawings, this embodiment of the invention will be seen to comprise an elongated generally rectangular closed housing generally indicated as 10 having side walls 12 and a top wall 14 forming an elongated tunnel like structure. The top wall 14 may be of a sectional construction, so that it may be removed for cleaning, or servicing, the details of which are omitted for the sake of clarity.

Supported within such housing 10, are two more or less horizontal support girders 16, which support at spaced intervals a plurality of generally U-shaped support bars 18. The U-shaped bars 18 are located at spaced apart intervals, and are shaped and dimensioned so as to receive the carcass of a hog shown in phantom as H.

The structure may be supported along its length by a system of legs 20.

A plurality of rotary beaters 22 are mounted on drive shafts 24, driven by motors 25. The beaters 22 are mounted in a radially offset pattern along lengths of the shafts 24 so that as shafts 24 rotate, the beaters 22 strike and pull at the skin of the hog and hairs extending therefrom, pulling the hairs out.

At the same time, due to the offset arrangement of the beaters 22, the carcass of the hog is moved slowly along the length of the structure from one end to the other, and at the same time is rolled over and over as it does so.

In order to scald the hog, water sprays 26 are provided at intervals, or more or less continuously along the length of the housing 10, so as to continuously spray hot clean water downwardly over the carcass of the hog H.

At the lower end of the housing 10 the side walls 12 are brought inwardly to provide a funnel 28, collecting the water and draining it down into a lower drainage tank 30.

A sheet metal grating 32 is provided in the mouth of the funnel 28, for collecting hair, and any larger debris.

A system of moveable scraper blades 34 are mounted for example on a chain drive 36, and may be dragged along the upper surface of the metal grating 32, so as to push the debris and hair to one end of the structure, where it may be collected in a suitable receptacle (not shown). It will be appreciated that the chain drive 36 will of course have a return portion, which is not shown for the sake of clarity but which is self-evident.

Water which collects in the drainage tank 30, will contain smaller debris, and other contaminants. It is accordingly drawn off through pipe 38, and passed through filter 40, by means of pump 42. Water is then pumped via supply pipe 44 to evaporation chamber 46.

In chamber 46 a suitable heat exchanger 48 will evaporate the water, and water vapour therefrom is drawn through pipe 50, by means of fan 52 and driven into condenser chamber 54. In chamber 54, a suitable heat exchanger 56 will chill the vapour, thereby condensing it, and such condensed water is then drawn off via pipe 58 and pump 60. A heat exchanger 62 may be provided in the pipe 58, to either raise or lower the water temperature depending upon the operation of the system, and such purified water is then supplied back to the spray heads 26.

In some circumstances it is possible to operate the evaporator chamber 46 more or less at atmospheric pressure, in which case the water therein will boil at the normal temperature of 100° C.

However, since the water spray is required to be delivered at between 62° C. and 63° C., such a process may involve the use of fairly substantial cooling being carried on in the heat exchanger 62.

Accordingly, where such heat values can be recovered and retained within the system, or be employed elsewhere in the plant, then this may not necessarily represent a complete loss to the system.

However, in the preferred case it is found that the evaporator chamber 46 may be operated at a reduced pressure, by insuring that fan 52 is capable of evacuating the chamber 46 to the point where water therein may boil at a much lower temperature i.e. around 65° to 70° C. In this case, the condensation of the water in chamber 54 will take place very much more readily, since that chamber may be at or even above atmospheric pressure. Consequently, the heat input required at heat exchanger 48, and the heat extraction required at heat exchanger 56 may be very substantially reduced, and it may even be possible to operate the two heat exchangers together, with little or no additional input of energy, other than that required to operate the fan 52.

It will of course be appreciated in this case that the water when condensed and removed from chamber 54 will be in the region of 60° C. to 65° C., and accordingly little or no heating and or cooling will be required from heat exchanger 62.

In order to start the system operating at the desired temperature levels, it is contemplated that an additional heating element 64 may be provided, for example in the drainage tanks 30, so as to heat up the water therein to the correct temperature when starting up.

In order to maintain the system at steady state operation, a temperature sensor 66 will sense the temperature of water at or close to the spray heads 26, and will deliver a continuous temperature reading to the logic control 68. This will in turn be connected with the het exchanger 62 the fan 52, and the heating element 64, so as to provide automatic control of these various functions.

In order to improve the rapid wetting of the skin and the hair of the hog, it is desireable, although not in fact essential to add saturated steam to the interior of housing 10. This may be achieved by means of steam duct 70, fan 72 and distribution plenum 74. Contaminants will build up fairly readily in the evaporator chamber 46, and accordingly a drain 76 is provided, by means of which they may periodically or continuously be removed.

Clearly the usual drains or cleanouts will be provided on the tank 30 and filter 40 for example, and elsewhere throughout the system in accordance with good engineering practice.

The entire structure may be built as a single continuous elongated structure of many feet in length. Alternatively it may be built up as a series of separate structures, of somewhat shorter length, arranged in tandem, with the hog carcasses being conveyed therethrough in sequence.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. The process of continuously scalding and dehairing hogs under improved sanitary conditions and comprising;

conveying hogs in an essentially horizontal manner through an elongated closed housing, being open at both ends, and defining a predetermined treatment path;

continuously spraying the hogs with clean water, while moving the same continuously and horizontally along such path;

continuously rotating the hogs along such treatment path and continuously scraping the hogs to remove hair therefrom while moving along such treatment path;

collecting water beneath the hogs, filtering the water, passing it into an evaporation chamber, evaporating the water to produce water vapour and passing said water vapour to a condenser chamber; and, continuously condensing said vapour therein to provide clean uncontaminated water at an elevated temperature, for spraying onto the hogs aforesaid.

2. The process as claimed in claim 1 including maintaining said evaporating chamber at a reduced pressure whereby to lower the boiling point of said water.

3. The process as claimed in claim 2 including the steps of recovering heat values in said condenser chamber and returning same to said evaporation chamber.

4. The process as claimed in claim 3 including the step of passing said clean water through a heat exchanger prior to spraying on said hogs as aforesaid.

5. The process as claimed in claim 1 including the step of continuously supplying water vapour at an elevated temperature to said housing.

6. The process as claimed in claim 5 including the stepof separating a portion of the water vapour evaporated in said evaporation chamber and supplying same to said housing as aforesaid.

7. The process as claimed in claim 1 including the step of passing said water through grating means to separate larger contaminants, and continuously scraping said grating means to remove said contaminants.

8. Apparatus for the continuous scalding and dehairing of hogs under improved sanitary conditions said apparatus comprising;

elongated closed housing means, having two open ends;

support means along the length of said housing for supporting a hog in an essentially horizontal manner therein;

power operated means operable to displace the hog along such path, and operable to remove hair therefrom;

water spray means operable to spray clean water over said hog as the same moves along such path;

collector tank means located beneath such path to collect water from hogs moving therealong;

water removal means and pump means connected therewith for removing water from such collector tank means;

a water evaporator chamber and heat exchanger means therein, connected to receive water from said collector tank means;

water condenser means connected to said evaporator chamber, to receive water vapour therefrom, and containing heat exchanger means therein, whereby to condense said vapour into water, and, pump means for removing water from such chamber and supplying same to said spray heads under pressure and at the desired temperature.

9. Apparatus as claimed in claim 8 including means for maintaining said evaporator chamber at a reduced pressure whereby to lower the boiling point of said water.

10. Apparatus as claimed in claim 9 including water vapour duct means connected to receive vapour generated in said evaporator chamber and eject the same within said housing.

11. Apparatus as claimed in claim 10 wherein said heat exchanger means in said evaporator chamber and in said condenser are coupled together in heat exchange relationship whereby to maximize the thermal efficiency of the apparatus.

12. Apparatus as claimed in claim 11 including temperature sensor means for monitoring the temperature of the water supply to the spray heads, and automatic circuit control means for regulating the operation of the apparatus whereby to maintain a stable operating temperature.

13. Apparatus as claimed in claim 12 including heat exchanger means connected to receive water from said condenser chamber, and regulate the temperature thereof prior to supply to said spray heads, whereby to provide a continuous supply of water at between 62° C. thereto.

14. Apparatus as claimed in claim 8 including hair removal means for collecting and removing hair displaced from hogs on such path.

15. Apparatus as claimed in claim 8 including filtering means for filtering water as the same is removed from such tanks.

16. Apparatus as claimed in claim 8 including drain means for removing contaminants from said chamber.

* * * * *